UNITED STATES PATENT OFFICE.

CHARLES MARCHAND, OF PORTLAND, OREGON.

PROCESS OF TREATING BY-PRODUCT LIQUORS FROM WOOD-SULFITE PLANTS.

1,155,256.  Specification of Letters Patent.  Patented Sept. 28, 1915.

No Drawing.  Application filed March 24, 1915. Serial No. 16,814.

*To all whom it may concern:*

Be it known that I, CHARLES MARCHAND, a citizen of the United States, residing at Portland, in the county of Multnomah and State of Oregon, have invented certain new and useful Improvements in Processes of Treating By-Product Liquors from Wood-Sulfite Plants; and I do hereby declare the following to be a full, clear, and exact description of the invention, such as will enable others skilled in the art to which it appertains to make and use the same.

This invention relates to the treatment of by-product residues from wood-pulp sulfite treatment, and has for an object to detoxicate such by-product whereby when run into streams it is rendered harmless to the fish resident therein, and also to conserve and utilize the acids, dextrose, and the like found therein.

It is well known that in wood-pulp sulfite treatment a by-product liquor is produced containing varying quantities of free sulfur dioxid, calcium bi-sulfite, magnesium bi-sulfite, and at times, sodium bi-sulfite. These substances, as will be perfectly apparent, are highly poisonous to fish resident within the waters in which such by-product liquor is now usually discharged, and the present invention comprehends the recovering of the acids, and the dextrose or other sugars also found in this by-product liquor, together with some tannin, rosin, and gum. The tannin, rosin and gum are in small quantities and of practically no value, and have no bearing or consideration in the present process.

According to my process, the sulfur dioxid is set free and the several sulfites are converted to their corresponding sulfates by the addition, during agitation, of a slight excess of dilute sulfuric acid. Other strong mineral acids such as phosphoric acid, nitric acid or hydrochloric acid can be used to set free the sulfur dioxid thus converting the sulfites respectively into phosphates, nitrates and chlorids, but for economical reasons sulfuric acid is preferable, the reaction which takes place being as follows:

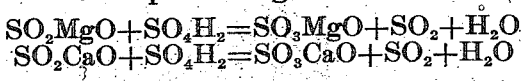

In practice, ten thousand liters of the original by-product liquor may be run into a tank with suitable agitating devices, and an analysis made. Assuming that the analysis shows a content of one per cent. magnesium sulfite, and seven-tenths per cent. calcium sulfite, both of these sulfites are converted in the corresponding sulfate by the addition thereto of a solution containing 280 liters of sulfuric acid of twenty-eight° Baumé, the reaction being as above.

As shown in the foregoing equation, the addition of the sulfuric acid converts the sulfites into sulfates, the sulfur dioxid is recovered and conserved by any of the usual well-known processes of recovering acids from their diluting liquors, as, for instance, as stated above, evaporating under low vacuum at a temperature under 80° C.

The residue remaining, as stated above, will show traces of sulfur dioxid and sulfuric acid. This sulfur dioxid is oxidized by the employment of an oxidizing agent such as hydrogen peroxid, sodium peroxid, barium peroxid, ozone, or potassium permanganate, the latter being preferred simply because of economy, sufficient potassium permanganate being employed to convert the remaining sulfurous acid into sulfuric acid—preferably a four per cent. solution of potassium permanganate being employed and added until all traces of sulfurous acid have been converted to manganese sulfate and potassium sulfate and manganese sulfate in accordance with the reaction:

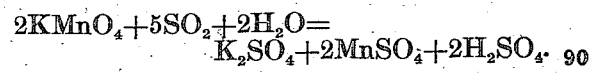

and ten thousand liters of the residue will ordinarily require about twenty liters of the four per cent. solution of potassium permanganate which represents approximately eight hundred (800) grams of crystallized potassium permanganate. After such reaction, the sulfuric acid is neutralized by the addition of an alkali, preferably milk of lime. The treated liquor is then permitted to stand in the tank which should be previously provided with a plurality of faucets at different heights so that the liquor may be drawn off without disturbing the precipitate. The liquor thus drawn off contains from two to four per cent. of dextrose and other sugars which are submitted to fermentation, and the alcohol produced by such fermentation distilled off in the usual manner.

The residue can safely be run into streams or other bodies of water containing fish without endangering the lives or health of the fish therein, while the sulfur dioxid recovered and the alcohol distilled off pay large returns upon the cost of the process and equipment.

I claim:—

1. The process of treating by-product liquors from sulfite wood pulp plants consisting in adding sulfuric acid, recovering part of the sulfur dioxid thus set free by evaporation, converting the remaining sulfur dioxid into sulfuric acid, and neutralizing the traces of sulfuric acid by the addition of an alkali.

2. The process of treating by-product liquors from wood sulfite plants consisting in adding sulfuric acid, recovering part of the sulfur dioxid, converting the remaining traces of sulfur dioxid into sulfuric acid, neutralizing the sulfuric acid, allowing to settle and decanting, fermenting the decanted liquor, and distilling off the alcohol.

3. The process of treating by-product liquors from wood-sulfite plants consisting in adding sulfuric acid, evaporating off part of the sulfur dioxid, adding a peroxid material to convert the remaining traces of sulfur dioxid into sulfuric acid, neutralizing the sulfuric acid by the addition of an alkali, allowing to settle and decanting, fermenting the decanted liquor, and distilling off the alcohol.

4. The process of treating by-product liquors from wood-sulfite plants consisting in adding sulfuric acid to convert the sulfite into sulfur dioxid, evaporating off the sulfur dioxid under vacuum, traces of sulfur dioxid and sulfuric acid remaining, treating the remaining traces of sulfur dioxid with an oxidizing agent to convert such sulfur dioxid to sulfuric acid, neutralizing the sulfuric acid by the addition of lime, allowing to settle and decanting, fermenting the decanted liquor, and distilling off the alcohol.

In testimony whereof I affix my signature in presence of two witnesses.

CHARLES MARCHAND.

Witnesses:
 LE ROY H. HUNTLEY,
 ANNA T. EDWARDS.